United States Patent
McDuff et al.

(10) Patent No.: US 8,821,094 B2
(45) Date of Patent: *Sep. 2, 2014

(54) ANCHOR ASSEMBLY WITH TOGGLE FOR HOLLOW WALLS

(71) Applicant: Cobra Fixations Cie Ltee—Cobra Anchors Co. Ltd., Anjou (CA)

(72) Inventors: Pierre McDuff, Outremont (CA); Alexandre Pollak, Laval (CA); Lang Nguyen, Dollard-des-Ormeaux (CA); Andre Bouchard, Montreal (CA)

(73) Assignee: Cobra Fixations Cie Ltee-Cobra Anchors Co. Ltd., Montreal (CA)

( * ) Notice: Subject to any disclaimer, the term of this patent is extended or adjusted under 35 U.S.C. 154(b) by 0 days.

This patent is subject to a terminal disclaimer.

(21) Appl. No.: 13/739,645

(22) Filed: Jan. 11, 2013

(65) Prior Publication Data

US 2013/0343831 A1 Dec. 26, 2013

Related U.S. Application Data

(63) Continuation of application No. 11/886,942, filed as application No. PCT/CA2006/000428 on Mar. 21, 2006, now Pat. No. 8,449,236.

(60) Provisional application No. 60/685,501, filed on May 31, 2005.

(30) Foreign Application Priority Data

Mar. 21, 2005 (CA) ...................................... 2502008

(51) Int. Cl.
*F16B 21/00* (2006.01)
(52) U.S. Cl.
USPC ............................ 411/344; 411/340; 411/349

(58) Field of Classification Search
USPC .................................. 411/344, 340, 346, 349
See application file for complete search history.

(56) References Cited

U.S. PATENT DOCUMENTS

| 147,343 A | 2/1874 | Miles |
| 165,206 A | 7/1875 | Brown |

(Continued)

FOREIGN PATENT DOCUMENTS

| CA | 1164333 A1 | 3/1984 |
| CA | 2252173 A1 | 4/2000 |

(Continued)

OTHER PUBLICATIONS

International Search Report for PCT/CA2004/000311 mailed Jul. 14, 2004.

(Continued)

*Primary Examiner* — Roberta Delisle
(74) *Attorney, Agent, or Firm* — Ungaretti & Harris LLP

(57) ABSTRACT

An anchor assembly (A) for hollow walls comprises an anchor body (400) and a toggle member (231) that is displaceable between a first position wherein the toggle member (231) is substantially aligned with the anchor body (400) such that the anchor assembly (A) can be inserted in the wall (W) via a cutting distal end (325) of the toggle member (231), and a second position wherein the toggle member (231) extends behind the wall (W) at an angle relative to the anchor body (400) which extends through the wall (W). The toggle member (231) is held captive in the first position but is released and then rotated to the second position by a fastener (218) introduced in the anchor body (400). The fastener (218) threadably engages the toggle member (231) thereby drawing the toggle member (231) against a hidden side of the wall (W).

18 Claims, 15 Drawing Sheets

(56) References Cited

U.S. PATENT DOCUMENTS

| | | |
|---|---|---|
| 365,725 A | 6/1887 | Buckland |
| 600,255 A | 3/1898 | Breul |
| 738,074 A | 9/1903 | Schick |
| 739,512 A | 9/1903 | Stannard |
| 745,722 A | 12/1903 | Jung |
| 1,100,170 A | 6/1914 | Brosius |
| 1,115,800 A | 11/1914 | Froberg |
| 1,132,414 A | 3/1915 | White |
| 1,159,420 A | 11/1915 | Rubly |
| 1,161,268 A | 11/1915 | Tuck |
| 1,185,587 A | 5/1916 | Bragg |
| 1,210,610 A | 1/1917 | Dehn |
| 1,333,692 A | 3/1920 | Wester |
| 1,389,540 A | 8/1921 | Washington |
| 1,409,291 A | 3/1922 | Giroux |
| 1,573,557 A | 2/1926 | Alexander |
| 1,637,981 A | 8/1927 | Baldwin |
| 1,670,398 A | 5/1928 | Silvino |
| 1,676,197 A | 7/1928 | Marrinan |
| 1,780,474 A | 11/1930 | Glazer |
| 1,802,934 A | 4/1931 | Balch |
| 1,999,575 A | 4/1935 | Reuter et al. |
| 2,193,306 A | 3/1940 | Tinnerman |
| 2,282,631 A | 5/1942 | Winship |
| 2,339,841 A | 1/1944 | Deuchler et al. |
| D170,196 S | 8/1953 | Gries |
| 2,698,470 A | 1/1955 | Buedingen |
| 2,751,807 A | 6/1956 | Harre |
| 2,883,946 A | 4/1959 | Kleef |
| 2,908,196 A | 10/1959 | Apfelzweig |
| 2,916,235 A | 12/1959 | Nagel |
| 3,020,602 A | 2/1962 | Siering |
| 3,127,807 A | 4/1964 | Modrey |
| 3,143,915 A | 8/1964 | Tendler |
| 3,248,994 A | 5/1966 | Mortensen |
| 3,268,195 A | 8/1966 | Hoffman |
| 3,282,547 A | 11/1966 | Ables |
| 3,288,014 A | 11/1966 | Aackersberg |
| 3,298,651 A | 1/1967 | Passer |
| 3,385,156 A | 5/1968 | Polos |
| 3,547,389 A | 12/1970 | Mitchell |
| 3,618,447 A | 11/1971 | Goins |
| 3,645,163 A | 2/1972 | Byland |
| 3,707,898 A | 1/1973 | Holly |
| 3,752,030 A | 8/1973 | Steurer |
| 3,861,631 A | 1/1975 | Shorin |
| 3,879,006 A | 4/1975 | Staudte, Jr. |
| 3,891,176 A | 6/1975 | Downing et al. |
| 3,895,773 A | 7/1975 | Solo |
| 3,912,211 A | 10/1975 | Topf |
| 3,926,394 A | 12/1975 | Mauceri et al. |
| 3,966,157 A | 6/1976 | Corral et al. |
| 4,043,245 A | 8/1977 | Kaplan |
| 4,075,924 A | 2/1978 | McSherry et al. |
| 4,103,854 A | 8/1978 | Pliml et al. |
| 4,120,231 A | 10/1978 | Neumayer |
| 4,181,061 A | 1/1980 | McSherry |
| 4,196,883 A | 4/1980 | Einhorn et al. |
| D259,700 S | 6/1981 | Chasen |
| 4,274,324 A | 6/1981 | Giannuzzi |
| 4,285,264 A | 8/1981 | Einhorn |
| 4,286,497 A | 9/1981 | Shamah |
| 4,294,156 A | 10/1981 | McSherry et al. |
| 4,300,745 A | 11/1981 | Peterson |
| 4,325,528 A | 4/1982 | Martin |
| 4,406,108 A | 9/1983 | Beck et al. |
| 4,422,608 A | 12/1983 | Hogg |
| 4,485,995 A | 12/1984 | Hogg |
| 4,509,713 A | 4/1985 | Hogg |
| 4,573,844 A | 3/1986 | Smith |
| 4,613,108 A | 9/1986 | Sundstrom et al. |
| 4,619,430 A | 10/1986 | Hogg |
| 4,650,386 A | 3/1987 | McSherry et al. |
| 4,664,350 A | 5/1987 | Dodds et al. |
| 4,697,969 A | 10/1987 | Sparkes |
| 4,719,917 A | 1/1988 | Barrows et al. |
| 4,821,992 A | 4/1989 | Johnson |
| 4,822,226 A | 4/1989 | Kennedy |
| 4,828,439 A | 5/1989 | Giannuzzi |
| D301,975 S | 7/1989 | Mullen |
| 4,871,140 A | 10/1989 | Hoskinson et al. |
| 5,028,030 A | 7/1991 | Lewis |
| 5,048,788 A | 9/1991 | Lorincz |
| 5,059,077 A | 10/1991 | Schmid |
| 5,067,864 A | 11/1991 | Dewey et al. |
| 5,149,037 A | 9/1992 | Smith |
| 5,215,418 A | 6/1993 | Trainer et al. |
| 5,221,169 A | 6/1993 | McSherry et al. |
| 5,236,293 A | 8/1993 | McSherry et al. |
| D339,980 S | 10/1993 | Sheehan |
| 5,267,718 A | 12/1993 | Sheehan |
| 5,267,719 A | 12/1993 | Keller |
| 5,308,203 A | 5/1994 | McSherry et al. |
| 5,322,401 A | 6/1994 | Vernet |
| 5,437,429 A | 8/1995 | Atlas |
| 5,447,005 A | 9/1995 | Giannuzzi |
| 5,529,449 A | 6/1996 | McSherry et al. |
| 5,536,121 A | 7/1996 | McSherry |
| 5,584,462 A | 12/1996 | Reese |
| 5,596,792 A | 1/1997 | Shelton |
| D378,052 S | 2/1997 | Perreault |
| D381,892 S | 8/1997 | Porter et al. |
| 5,702,218 A | 12/1997 | Onofrio |
| 5,725,302 A | 3/1998 | Sirkin |
| 5,752,792 A | 5/1998 | McSherry |
| 5,755,545 A | 5/1998 | Banks |
| 5,833,415 A | 11/1998 | McSherry |
| D404,287 S | 1/1999 | Hepworth |
| 5,876,169 A | 3/1999 | Wrigley |
| 5,878,988 A | 3/1999 | Rakower |
| 5,881,982 A | 3/1999 | Hollingsworth et al. |
| D409,082 S | 5/1999 | Donahue |
| 5,944,295 A | 8/1999 | McSherry |
| D417,385 S | 12/1999 | Bries et al. |
| 6,036,149 A | 3/2000 | Del Pino et al. |
| D424,816 S | 5/2000 | Snell |
| 6,126,126 A | 10/2000 | McKiernan, Jr. |
| 6,250,865 B1 | 6/2001 | McSherry |
| 6,279,862 B1 | 8/2001 | Gershowitz |
| D457,419 S | 5/2002 | McSherry et al. |
| 6,419,436 B1 | 7/2002 | Gaudron |
| 6,431,510 B1 | 8/2002 | Lydecker et al. |
| 6,435,789 B2 | 8/2002 | Gaudron |
| D462,895 S | 9/2002 | Gaudron |
| 6,457,926 B1 | 10/2002 | Pope |
| D473,451 S | 4/2003 | Goodman et al. |
| D480,292 S | 10/2003 | Johansson et al. |
| D480,625 S | 10/2003 | Snell |
| D486,057 S | 2/2004 | Chen |
| 6,695,276 B2 | 2/2004 | Skorka |
| D493,699 S | 8/2004 | Goodman et al. |
| D494,452 S | 8/2004 | Sheldon et al. |
| 6,821,069 B2 | 11/2004 | Ikuta |
| 6,830,228 B2 | 12/2004 | Ernst |
| 6,884,012 B2 | 4/2005 | Panasik |
| 6,969,220 B2 | 11/2005 | Anquetin |
| D515,911 S | 2/2006 | McDuff |
| D516,412 S | 3/2006 | McDuff |
| 7,160,074 B2 | 1/2007 | Ernst et al. |
| D554,481 S | 11/2007 | Newbould et al. |
| D554,483 S | 11/2007 | Hager et al. |
| D557,595 S | 12/2007 | Ernst et al. |
| 7,320,569 B2 | 1/2008 | Kaye et al. |
| D566,532 S | 4/2008 | Wolff |
| 7,395,998 B2 | 7/2008 | Peterson |
| D593,141 S | 5/2009 | Gaudron |
| 7,540,458 B2 | 6/2009 | Forbes |
| 7,547,171 B2 | 6/2009 | McDuff |
| D596,930 S | 7/2009 | Gaudron |
| D605,933 S | 12/2009 | Gaudron |
| D607,311 S | 1/2010 | Snider |
| 7,694,401 B2 | 4/2010 | Peterson |
| 7,713,013 B2 | 5/2010 | Sedgwick et al. |
| D626,403 S | 11/2010 | Portz |

(56) References Cited

U.S. PATENT DOCUMENTS

| | | |
|---|---|---|
| D630,088 S | 1/2011 | Kim |
| D630,089 S | 1/2011 | Kim |
| D635,843 S | 4/2011 | McDuff et al. |
| D636,256 S | 4/2011 | McDuff et al. |
| D642,900 S | 8/2011 | McDuff et al. |
| D649,022 S | 11/2011 | McDuff et al. |
| D649,023 S | 11/2011 | McDuff et al. |
| D649,436 S | 11/2011 | McDuff et al. |
| D649,437 S | 11/2011 | McDuff et al. |
| D649,438 S | 11/2011 | McDuff et al. |
| D649,439 S | 11/2011 | McDuff et al. |
| D650,261 S | 12/2011 | McDuff et al. |
| 8,303,224 B2 | 11/2012 | McDuff et al. |
| 2001/0046429 A1 | 11/2001 | Gaudron |
| 2002/0171017 A1 | 11/2002 | McKeirnan et al. |
| 2006/0134375 A1 | 6/2006 | Peterson |
| 2006/0182517 A1 | 8/2006 | McDuff |
| 2007/0124910 A1 | 6/2007 | Peterson et al. |
| 2007/0235622 A1 | 10/2007 | Baran et al. |
| 2008/0115343 A1 | 5/2008 | Peterson |
| 2008/0253860 A1 | 10/2008 | McDuff et al. |
| 2009/0003962 A1 | 1/2009 | McDuff et al. |
| 2009/0269158 A1 | 10/2009 | McDuff |
| 2010/0005756 A1 | 1/2010 | McDuff |
| 2012/0001039 A1 | 1/2012 | McDuff et al. |
| 2012/0001040 A1 | 1/2012 | McDuff et al. |

FOREIGN PATENT DOCUMENTS

| | | |
|---|---|---|
| CA | 2458320 A1 | 8/2004 |
| CA | 2420718 | 9/2004 |
| CH | 491296 | 5/1970 |
| CN | 1384293 A | 12/2002 |
| EP | 0713981 A1 | 5/1996 |
| JP | 7174124 A | 7/1995 |
| JP | 2003531344 A | 10/2003 |
| WO | 96/02170 | 2/1996 |
| WO | 96/16273 | 5/1996 |
| WO | 9905419 A1 | 2/1999 |
| WO | 2004079209 A1 | 9/2004 |

OTHER PUBLICATIONS

International Search Report for PCT/CA2006/000419 mailed Jul. 6, 2006.
International Search Report for PCT/CA2006/000428 mailed Jul. 13, 2006.
International Search Report for PCT/US2003/039974 mailed Jul. 16, 2004.
Office Action mailed May 8, 2009 in Chinese Application No. CN 2006800136128, with English translation.
Office Action mailed Sep. 6, 2011 in Japanese Application No. JP 2008-502203, with English translation.
International Search Report for PCT/CA2009/001572 mailed Jan. 15, 2010.
International Search Report for PCT/CA2009/001669 mailed Feb. 3, 2010.

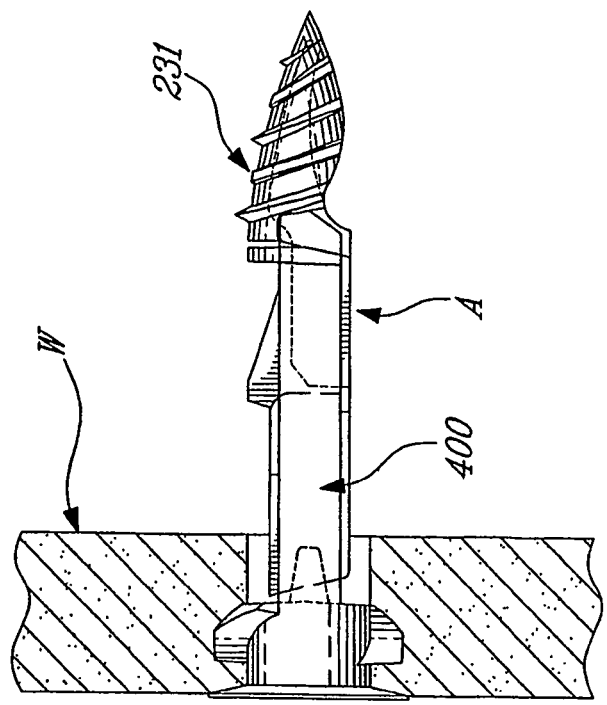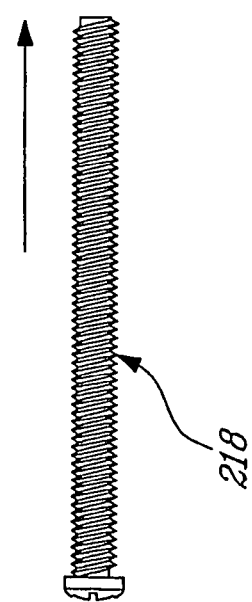
Fig. 21c

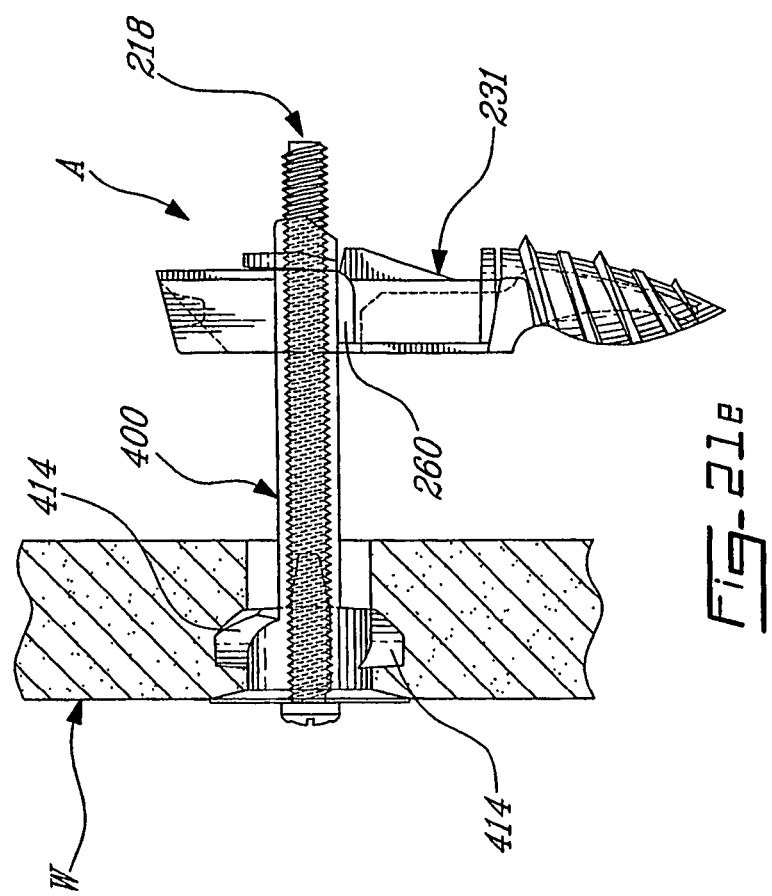

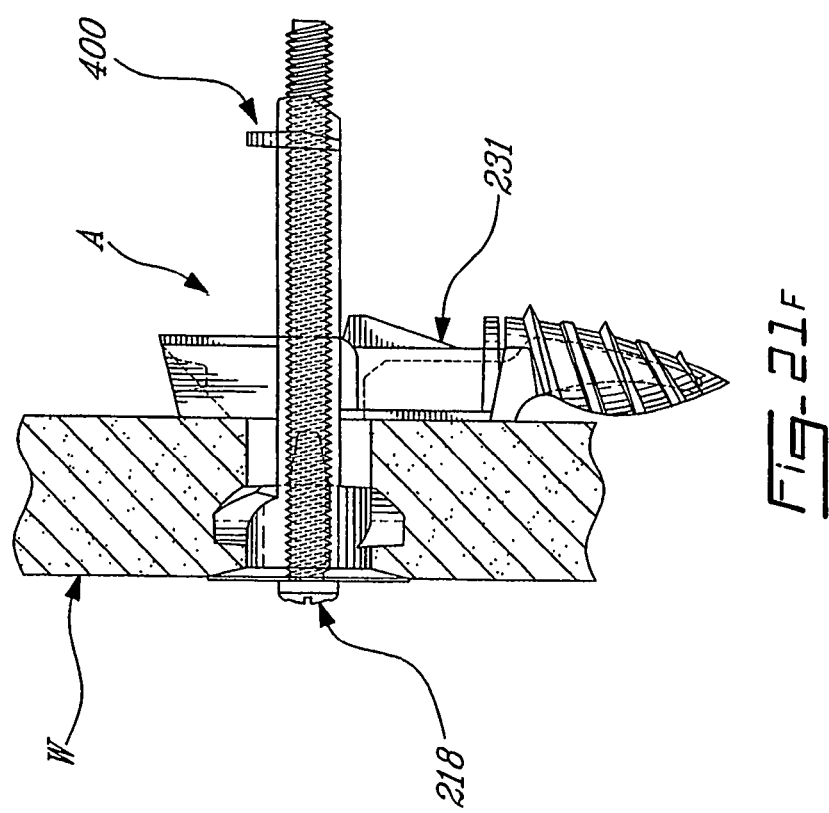

ANCHOR ASSEMBLY WITH TOGGLE FOR HOLLOW WALLS

CROSS REFERENCE TO RELATED APPLICATIONS

This Application is a continuation of U.S. application Ser. No. 11/886,942, filed Jun. 18, 2008, which is a 371 filing of International Application No. PCT/CA2006/000428 filed on Mar. 21, 2006, which claims priority on Canadian Patent Application No. 2,502,008 filed on Mar. 21, 2005 and on U.S. Provisional Patent Application No. 60/685,501 filed on May 31, 2005, which are herein incorporated by reference.

FIELD OF THE INVENTION

This invention relates to anchoring devices for fastening objects to hollow walls of plaster board, masonry, brick and the like wherein elongated fasteners, such as bolts, screws, etc. may be attached for further attachment of a work piece or fixture. More particularly, the invention relates to so-called toggle bolt anchors which penetrate wall board material and the like with a nut or anchor portion extending along a first axis, the anchor portion being moveable to a position extending along an axis normal to the first axis so that a threaded bolt may engage the threads of the nut to draw the nut against the back surface of the wall board or so that a screw may tap threads in the anchor portion to draw the anchor portion against the back surface of the wall board.

BACKGROUND OF THE INVENTION

In U.S. Pat. No. 5,221,169 issued to McSherry et al. on Jun. 22, 1993, which is herewith incorporated herein by reference, there is disclosed an anchor assembly for fasteners which comprises a pair of elongated wire-like legs supported in parallel relation with an anchor moveably supported on the legs and moveable from a first position substantially in alignment with the legs to a position transverse to the legs, and wherein the anchor defines tracks on each side to support the anchor on the legs. Pivotal movement of the anchor is achieved by the interaction between the tracks on the anchor and the legs upon which the anchor rides.

The problem with most anchors of the above type is that a hole has to be drilled in the wall before the anchor assembly can be inserted in the hole to dispose the anchor portion in the wall hollow to be drawn against the back surface of the wall. Drilling, especially in friable wall board material, usually results in a damaged rear surface and thus a weakened wall. This results even in the instance where a drill tip is applied to a leading end of an anchor in such an anchor assembly.

U.S. Pat. No. 6,250,865-B1 issued to McSherry on Jun. 26, 2001, which is herewith incorporated herein by reference, discloses a wall anchor assembly for fasteners, which comprises a drilling tip at a leading end of the toggle, i.e. of the anchor member, of the anchor assembly. More particularly, the anchor assembly has a pair of posts extending from a collar. The collar has an opening for passing a part of a screw. Distal from the collar, the posts are connected by a connector. The anchor member is captive between the posts and between the collar and the connector. The anchor assembly has a penetrating configuration in which the anchor axis is substantially parallel to the assembly axis, and the anchor body portion and posts form a body portion. A tongue protrudes from an inside surface of a post and engages a groove on the anchor member in the penetrating configuration with the longitudinal anchor axis substantially parallel to the assembly axis, and transmits axial rotation from the collar to the anchor member. The screw engages a hole in the anchor to draw the anchor member against the wall to clamp the anchor assembly to the wall.

SUMMARY OF THE INVENTION

It is therefore an aim of the present invention to provide an improved anchor assembly.

Therefore, in accordance with the present invention, there is provided an anchor assembly for hollow walls, comprising an anchor body and a toggle member moveably mounted to said anchor body, said toggle member being displaceable between first and second positions thereof, wherein in said first position said toggle member is substantially aligned with said anchor body such that the anchor assembly can be rotated for insertion in the wall, and wherein in said second position said toggle member extends behind the wall at an angle relative to said anchor body with said anchor body extending through the hole in the wall, said toggle member being held captive in said first position but being displaceable longitudinally along said anchor body when an appropriate fastener is introduced in said anchor body, deflector means being provided for causing, after a sufficient longitudinal displacement of said toggle member has released the same from a captive state thereof, said toggle member to pivot relative to said anchor body to said second position, said toggle member being adapted to then threadably receive the fastener such that further rotation of the fastener draws said toggle member against a hidden side of the wall with said anchor body being held substantially fixed relative to the wall, said anchor body and said toggle member being provided with at least first and second locking means that cooperate for retaining said toggle member in said captive state when in said first position, said locking means being spaced apart.

Also in accordance with the present invention, there is provided an anchor assembly for hollow walls, comprising an anchor body and a toggle member moveably mounted to said anchor body, said toggle member being displaceable between first and second positions thereof, wherein in said first position said toggle member is substantially aligned with said anchor body such that the anchor assembly can be rotated for insertion in the wall, and wherein in said second position said toggle member extends behind the wall at an angle relative to said anchor body with said anchor body extending through the hole in the wall, said toggle member being held captive in said first position but being displaceable longitudinally along said anchor body when an appropriate fastener is introduced in said anchor body, deflector means being provided for causing, after a sufficient longitudinal displacement of said toggle member has released the same from a captive state thereof, said toggle member to pivot relative to said anchor body to said second position, said toggle member being adapted to then threadably receive the fastener such that further rotation of the fastener draws said toggle member against a hidden side of the wall with said anchor body being held substantially fixed relative to the wall, wherein said anchor body comprises a proximal collar provided on a leading side thereof with at least one curved locking protrusion extending outwardly from said collar and adapted to engage the wall at the end of the rotary installation of said anchor assembly in the wall and thereby provide resistance to a further rotation of said anchor assembly relative to the wall.

Further in accordance with the present invention, there is provided an anchor assembly for hollow walls, comprising an anchor body and a toggle member moveably mounted to said anchor body, said toggle member being displaceable between first and second positions thereof, wherein in said first position said toggle member is substantially aligned with said anchor body such that the anchor assembly can be rotated for insertion in the wall, and wherein in said second position said toggle member extends behind the wall at an angle relative to said anchor body with said anchor body extending through the hole in the wall, said toggle member being held captive in said first position but being displaceable longitudinally along said anchor body when an appropriate fastener is introduced in said anchor body, deflector means being provided for causing, after a sufficient longitudinal displacement of said toggle member has released the same from a captive state thereof, said toggle member to pivot relative to said anchor body to said second position, said toggle member being adapted to then threadably receive the fastener such that further rotation of the fastener draws said toggle member against a hidden side of the wall with said anchor body being held substantially fixed relative to the wall, wherein said toggle member has opposed proximal and distal ends, a recess being defined in said proximal end of said toggle member and being adapted to receive a leading section of a rotary tool, such that the leading section of the tool can engage said recess in said first position and be rotated for inserting said anchor assembly in the wall with said distal end of said toggle member being adapted to cut through the wall.

Still further in accordance with the present invention, there is provided an anchor assembly for hollow walls, comprising an anchor body and a toggle member moveably mounted to said anchor body, said toggle member being displaceable between first and second positions thereof, wherein in said first position said toggle member is substantially aligned with said anchor body such that the anchor assembly can be rotated for insertion in the wall, and wherein in said second position said toggle member extends behind the wall at an angle relative to said anchor body with said anchor body extending through the hole in the wall, said toggle member being held captive in said first position but being displaceable longitudinally along said anchor body when an appropriate fastener is introduced in said anchor body, deflector means being provided for causing, after a sufficient longitudinal displacement of said toggle member has released the same from a captive state thereof, said toggle member to pivot relative to said anchor body to said second position, said toggle member being adapted to then threadably receive the fastener such that further rotation of the fastener draws said toggle member against a hidden side of the wall with said anchor body being held substantially fixed relative to the wall, wherein a threaded hole is defined in said toggle member for receiving a threaded fastener, such as a machine screw.

Still further in accordance with the present invention, there is provided an anchor assembly for hollow walls, comprising an anchor body and a toggle member moveably mounted to said anchor body, said toggle member being displaceable between first and second positions thereof, wherein in said first position said toggle member is substantially aligned with said anchor body such that the anchor assembly can be rotated for insertion in the wall, and wherein in said second position said toggle member extends behind the wall at an angle relative to said anchor body with said anchor body extending through the hole in the wall, said toggle member being held captive in said first position but being displaceable longitudinally along said anchor body when an appropriate fastener is introduced in said anchor body, deflector means being provided for causing, after a sufficient longitudinal displacement of said toggle member has released the same from a captive state thereof, said toggle member to pivot relative to said anchor body to said second position, said toggle member being adapted to then threadably receive the fastener such that further rotation of the fastener draws said toggle member against a hidden side of the wall with said anchor body being held substantially fixed relative to the wall, wherein said anchor body is made of a plastics material, such as nylon, and said toggle member is made of a metallic material, such as zinc, temporary locking means being provided between said anchor body and said toggle member in said first position for providing rigidity to said anchor assembly.

More specifically, said anchor body comprises a proximal collar defining a hexagonal socket adapted to receive a hexagonal bit of a tool such that the tool can engage said socket such that the tool can engage said recess and can be rotated for inserting said anchor assembly, in said first position, in the wall.

BRIEF DESCRIPTION OF THE DRAWINGS

Having thus generally described the nature of the invention, reference will now be made to the accompanying drawings, showing by way of illustration a preferred embodiment thereof, and in which:

FIGS. 1 to 14 are various views of a conventional anchor assembly, wherein FIG. 1 is a top plan view of a collar and posts of this anchor assembly;

FIG. 2 is a longitudinal cross-section taken along the line 2-2 of FIG. 1;

FIG. 3 is a vertical cross-section taken along the line 3-3 of FIG. 1;

FIG. 4 is a vertical cross-section taken along the line 4-4 of FIG. 1;

FIG. 5 is a side view showing a flanged end of the collar and post portion of the anchor assembly;

FIG. 6 is a top plan view of the screw tipped anchor portion of the anchor assembly;

FIG. 7 is a front elevational view of the anchor portion of FIG. 6;

FIG. 8 is a bottom plan view of the anchor portion of FIG. 6;

FIG. 9 is a vertical cross-section taken along the line 9-9 of FIG. 7;

FIG. 10 is a vertical cross-section taken along the line 10-10 of FIG. 7;

FIG. 11 is an end view of the anchor of FIG. 6;

FIG. 12 is a top plan view of the conventional anchor assembly;

FIG. 13 is a front elevational view of the anchor assembly, with a mock fastener head extending from the proximal end of the anchor assembly;

FIG. 14 is a front elevational view of the anchor assembly of FIG. 13 in "action" showing the positions of the anchor portion as it is pivoted to its anchoring position, which is shown in full lines;

FIGS. 21a to 21f are successive partly cross-sectional schematic side views showing the installation of the anchor assembly of FIGS. 15 to 19 into a wall.

DESCRIPTION OF THE ILLUSTRATIVE EMBODIMENTS

Figure 1:
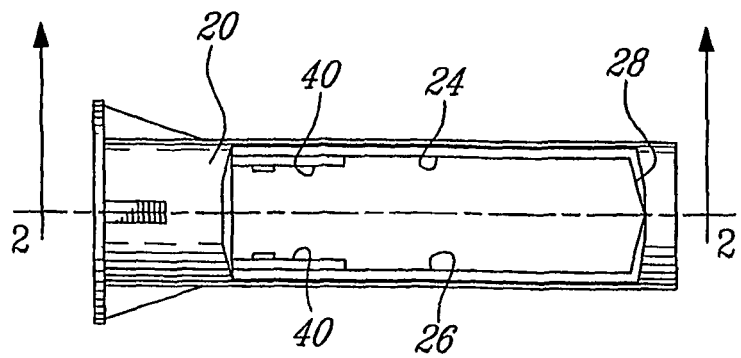
Figure 2:
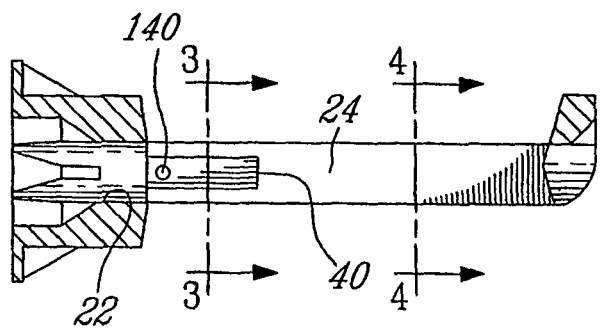
Figures 3, 4:
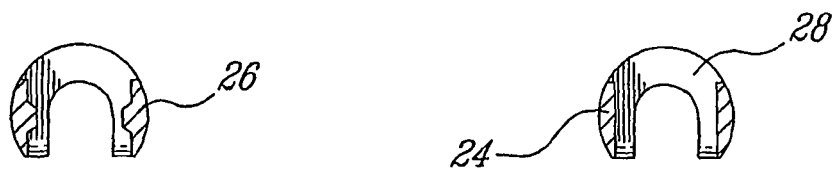
Figure 5:
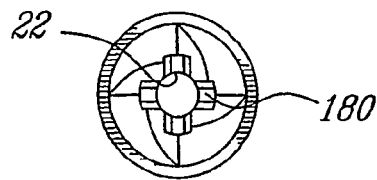
Figure 6:
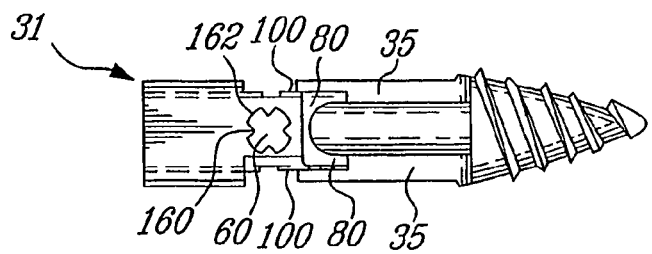
Figure 7:
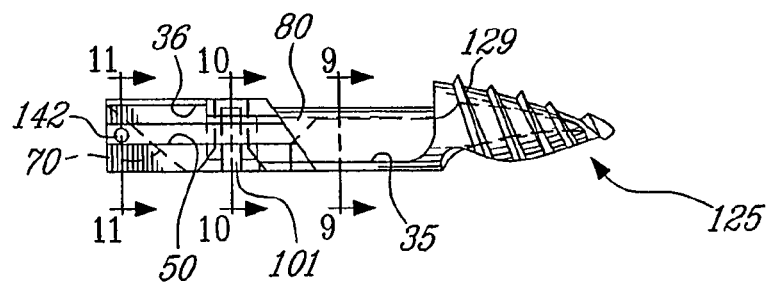
Figure 8:
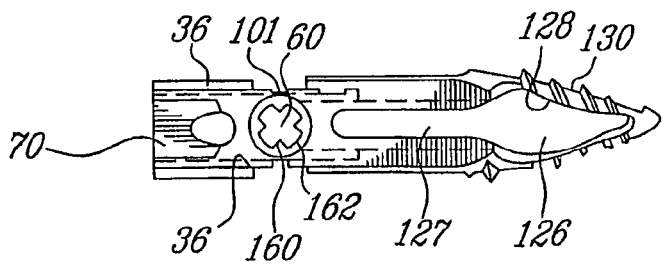
Figure 9:
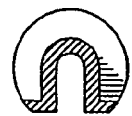
Figure 10:
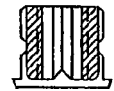
Figure 11:
Figure 12:
Figure 13:
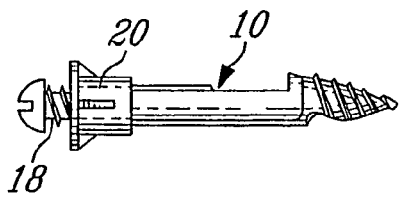
Figure 14:
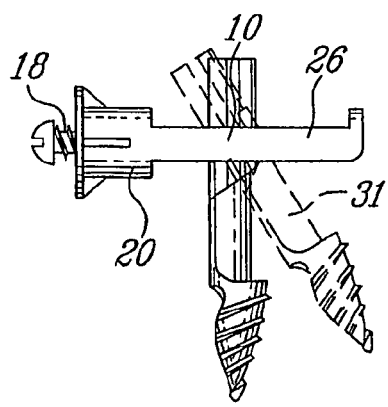

FIGS. 1 to 14 show the conventional anchor assembly 10 of aforementioned U.S. Pat. No. 6,250,865-B1, and a detailed description thereof follows hereinbelow.

The anchor assembly 10 includes a collar 20 having an aperture 22 dimensioned and configured to receive the shank portion of a bolt 18, or the like. A pair of posts, 24, 26 extend integrally from the collar in parallel relation on either side of the post and collar portion of the assembly. The posts are connected to one another at their distal ends by a bent connecting end 28. The collar and aperture are configured to assure alignment between anchor member 31 and bolt fastener 18.

The anchor portion has forward and rearward tracks 35, 36 disposed on opposite sides of the anchor portion which slidably engage the opposite sides of the posts as the anchor portion is initially moved forward by engagement of a forwardly moving bolt. The anchor portion is maintained in parallel relation with the posts by engagement of the ridges 40 and channels 50 on the posts and sides of the anchor portion respectively. When the anchor portion channels pass the end of the post ridges, the anchor is permitted to move from its position with its axis parallel with the posts to a position with its axis normal to the posts so that the bolt may be threaded in the hole 60 of the anchor portion to draw the anchor portion against the back surface of the wall.

An internal ramp 70 is provided at the proximal end of the anchor portion to engage the end of the bolt resulting in the directing of the anchor portion out of parallel with the with the posts. External ramps 80 on either side of the anchor portion between the forward and rearward tracks 36, 36, which slide on the edges of the posts, interact with the connection 28 between the posts to assure out of parallel relationship with the posts as well.

There is a space 100 between the forestward and rearmard tracks on either side of the anchor portion equal to the width of the posts to permit the 90-degree axes displacement of the anchor portion and collar and post portion. Channels 101 within these spaces receive the post ridges 40 when the anchor axis is normal to the axes of the posts.

The anchor portion and the collar and post portions are press fit in the assembly process. The assembly can be made of various materials, metal or plastic.

The anchor member 31 is provided with a screw tip 125 on the distal end thereof together with a flute 126 with a cutting leading edge and which extends proximally to a channel 127. The leading edge 128 of the flute cuts the wall material which is deposited in the flute and given access to the channel thereby lessening the amount of wall board material which will be compressed between turns of the relatively high taping threads 129 of the screw tip and around the compression band 130 which runs between and parallel to the thread The leading edge is distended and curves back at its proximal edge. This shape together with the screw threads draws the anchor through the wall material rather than pushing the material forward as occurs with a drilling action As in FIG. 2, protrusion 140 on ridge 40 of post 26 secures detent 142 (FIG. 7) on channel 50 of anchor member 31.

Bolt 18 may be a bolt, a machine screw, a self-tapping screw, or the like. In the presently preferred embodiment, bolt 18 is a self tapping type screw having a coarse thread tapering smaller at shaft end to a truncated conical shaft tip, which engages an unthreaded hole 60 (FIG. 8) having four tappable ridges 160 protruding therein. Spaces 162 between ridges 160 provide a place for ridge material displaced by the tapping to go.

Bolt 18 has a head which receives either Phillips or blade screwdrivers, as does the cross-slot 180 of collar 20.

FIGS. 15 to 20 illustrate an anchor assembly A in accordance with the present invention, and a detailed description thereof follows hereinafter. As the anchor assembly A of the present invention has similarities both structurally and operatively with the conventional anchor assembly 10 of aforementioned U.S. Pat. No. 6,250,865-B1 (FIGS. 1 to 14), the following description will be abbreviated for conciseness by describing features of the anchor assembly A not found in the conventional anchor assembly 10. Also, in the following description and drawings that pertain thereto, components of anchor assembly A which are similar or identical in function and/or in structure to corresponding components of anchor assembly 10 of FIG. 1 (and FIGS. 2 to 14) bear the same references as in FIG. 1 (and FIGS. 2 to 13), but with 200 having been thereto. New components (or components not identified for anchor assembly 10) provided in anchor assembly A start at reference numeral 400.

In the anchor member 231 of anchor assembly A, the hole 260 is threaded and the fastener 218 is a bolt or a machine screw (e.g. of size ⅛", 3/16" or ¼"), whereby the fastener does not have to tap a thread in the hole (as in hole 60 of anchor assembly 10).

Figure 15:
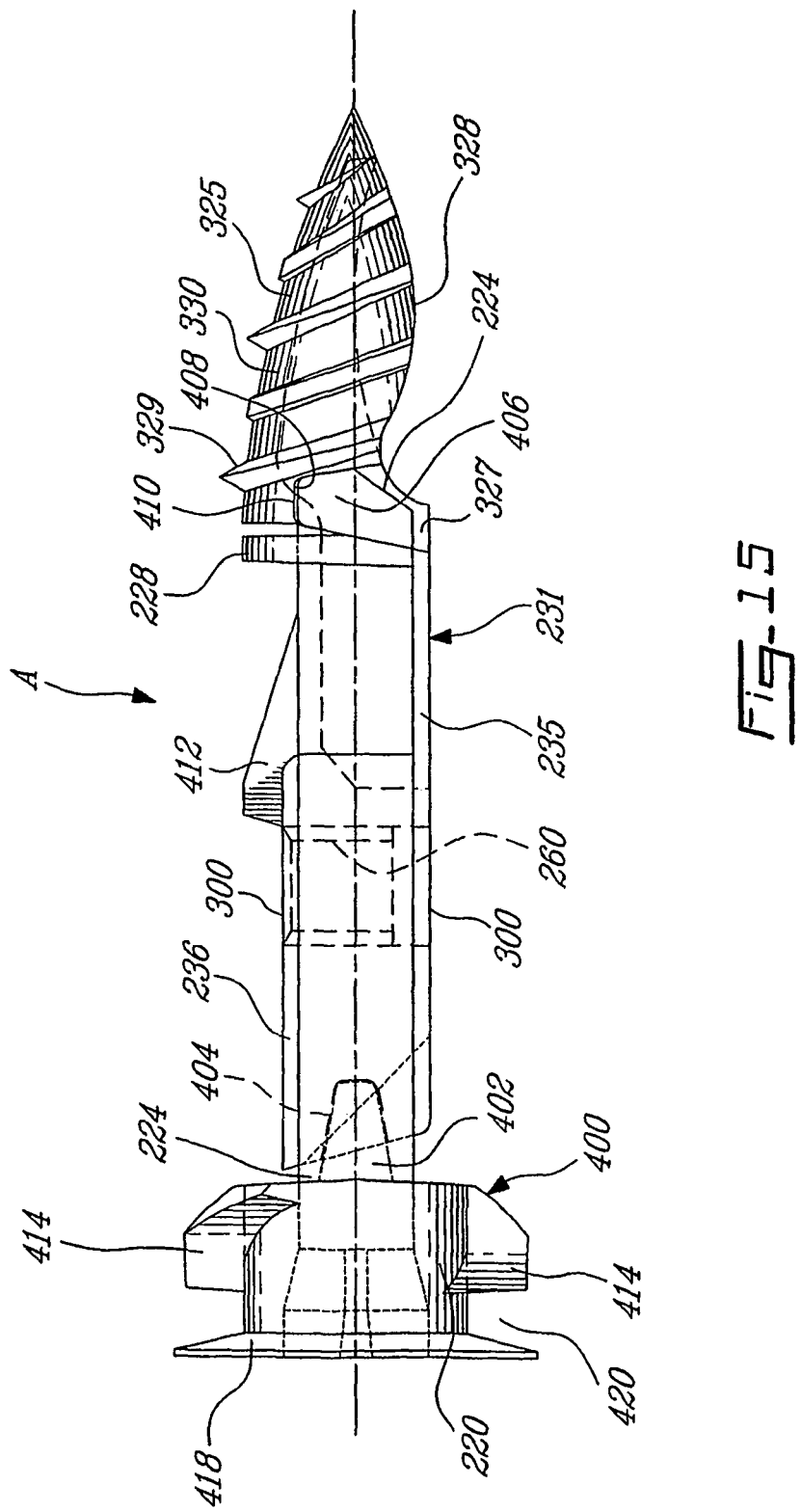
FIG. 15 is a front elevational view of an anchor assembly in accordance with the present invention, showing a toggle member of the anchor assembly in a first insertion position thereof.
Figure 16:
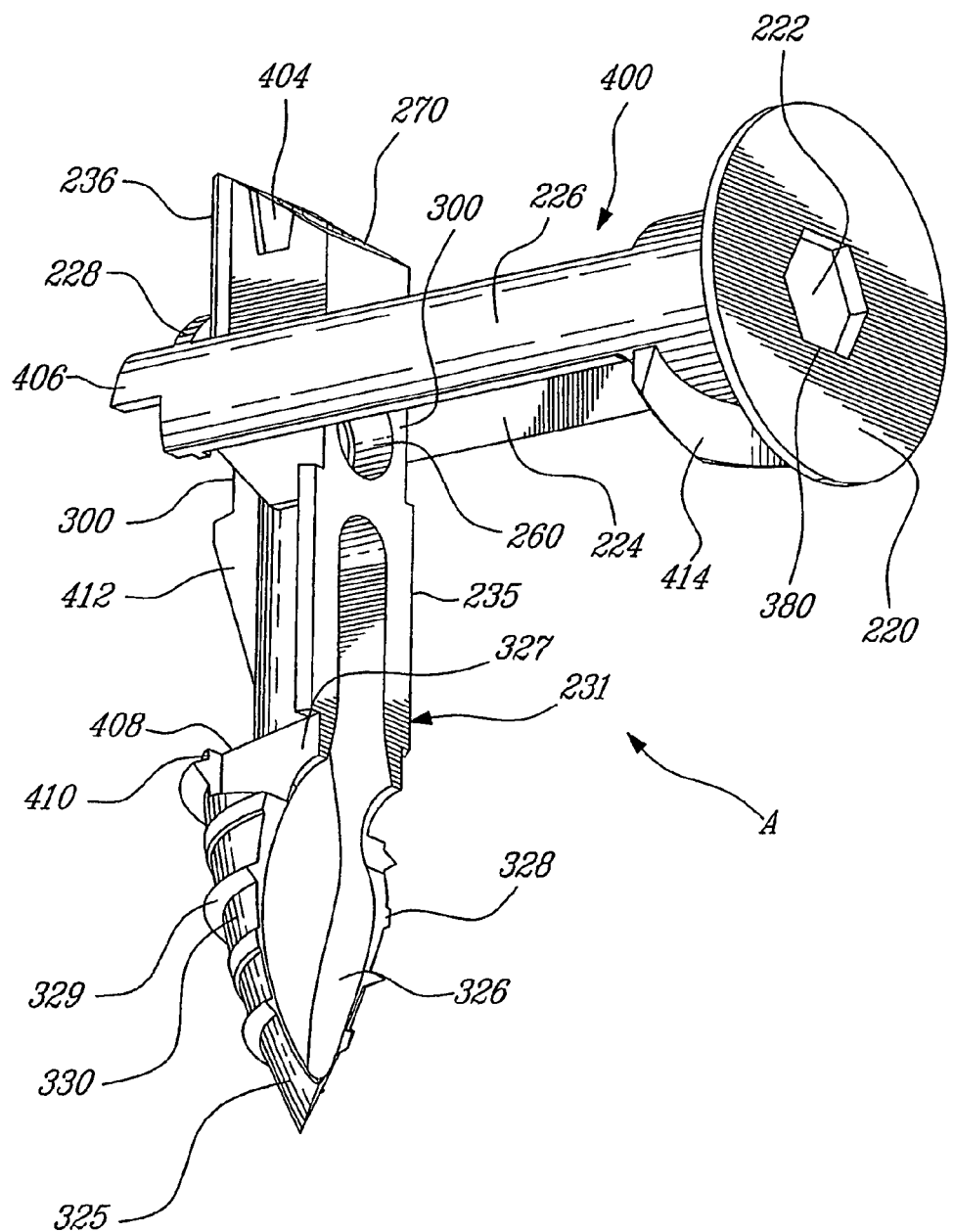
FIG. 16 is a bottom perspective view of the anchor assembly of FIG. 15, showing the toggle member in a second retention position thereof.
Figure 17:
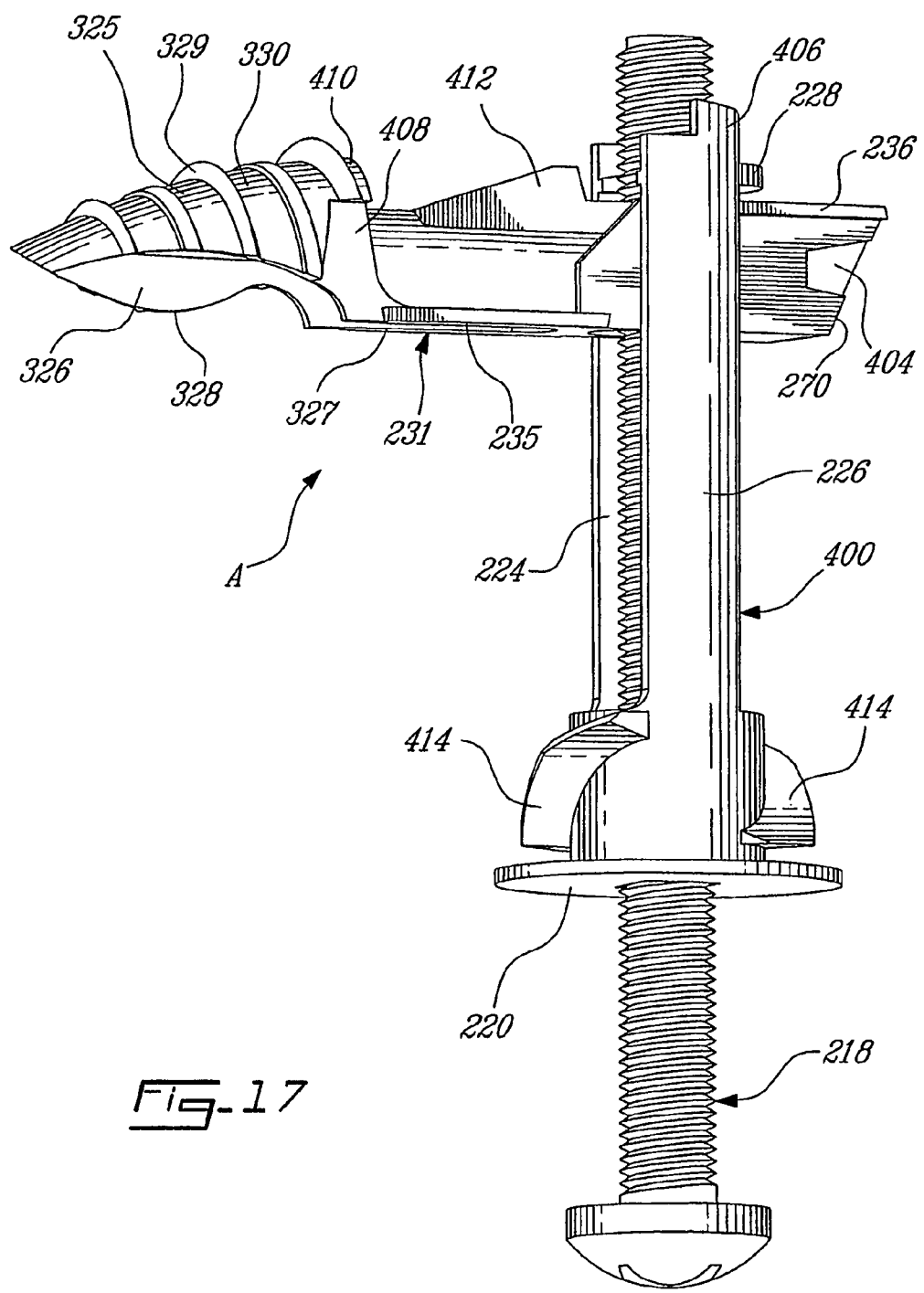
FIG. 17 is a front elevational view, taken slightly from a bottom perspective, of the anchor assembly, this view being similar to FIG. 16 but showing a fastener engaged to the anchor assembly.
Figure 18:
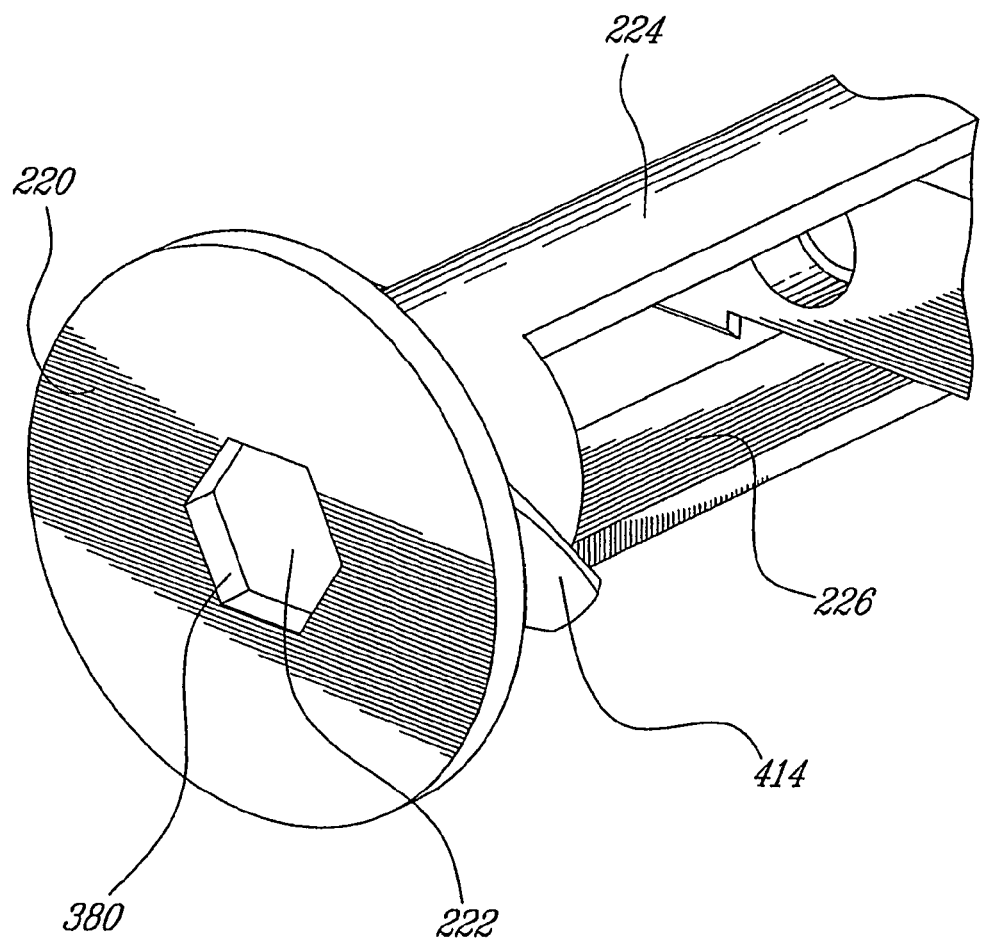
FIG. 18 is an enlarged perspective view principally of a head portion of the anchor assembly.
Figure 19:
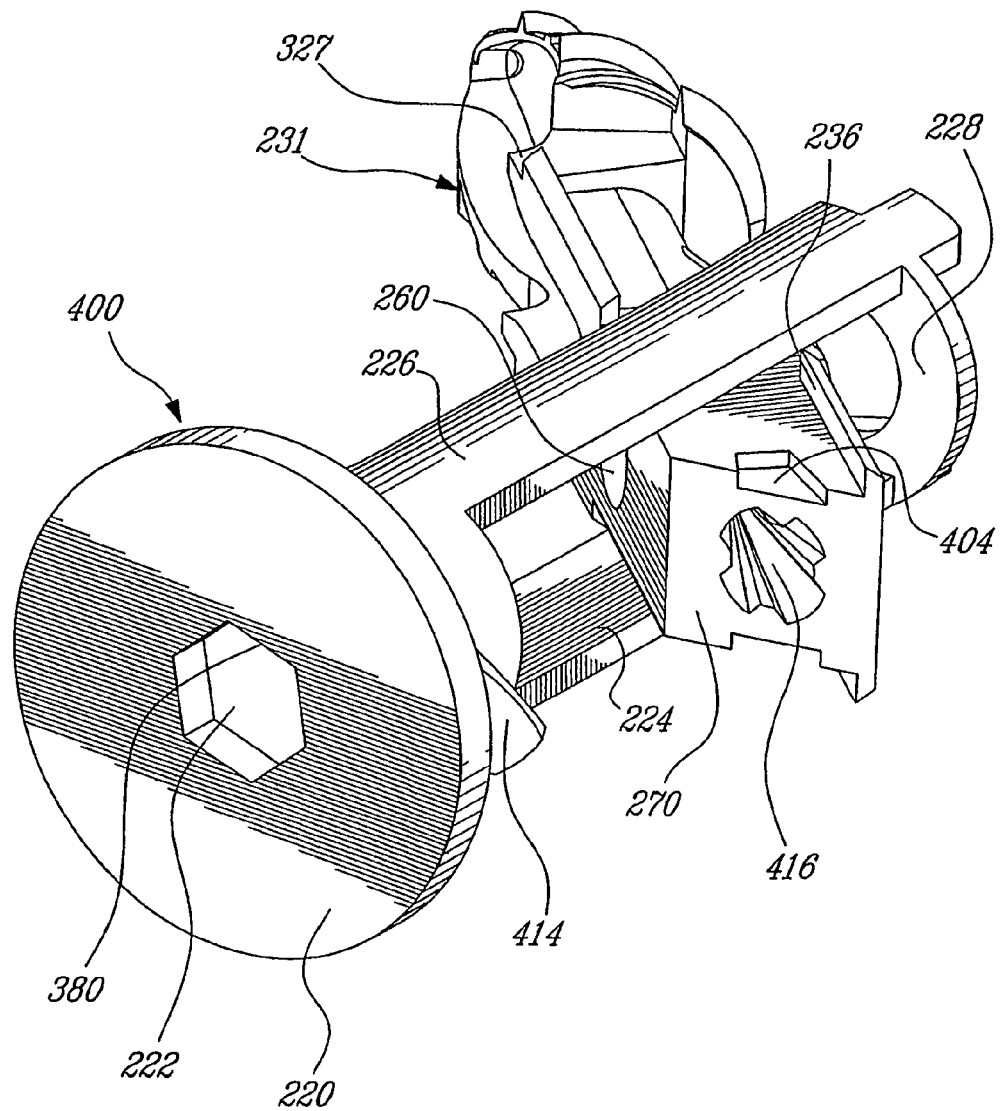
FIG. 19 is an enlarged view of a proximal, i.e. trailing, end of the toggle member of the anchor assembly.

The anchor assembly 10 is completely made of zinc, whereas a fixed body 400 of the anchor assembly A is typically made of a plastics material, such as nylon. The toggle anchor member 231 generally remains made of zinc. To compensate for the relative flexibility of nylon, which could manifest itself during the rotary installation of the anchor assembly in a wall, ceiling, etc., first and second temporary locking systems are provided, which are operational when the anchor assembly A is in an insertion position thereof, as seen in FIG. 15, wherein the toggle anchor member 231 is aligned with the nylon body 400 and is longitudinally retracted with respect thereto. These first and second temporary locking systems are provided in addition to the interaction between the tracks 235 and 236 with the posts 224 and 226 (see FIG. 15), and to the interaction between the connecting end 228 and a proximal end 410 of the screw tip 325 (see FIG. 15).

The first locking system includes male elements, or tongues, 402 (see FIG. 15) defined on inner surfaces of the posts 224 and 226 of the fixed body 400, and female elements, or grooves, 404 (see FIGS. 16 and 17) defined at a proximal, i.e. trailing, end of the anchor member 231 and engaged by the male elements 402 in the insertion position.

The second first locking system includes male elements 406 (see FIGS. 15 to 17) extending forwardly at the distal, i.e. leading, end of the fixed body 400, and female elements 408 (see FIGS. 15 and 17) defined at the proximal end 410 of the screw tip 325 and engaged by the male elements 406 in the insertion position.

The anchor member 231 is also provided with a protruding sloped element 412 that, after some longitudinal displacement of the anchor member 231 along the fixed body 400 caused by the gradual advancement in the anchor assembly A (in its insertion position) of the machine screw 218, engages the connecting end 228 thereby causing the anchor member 231 to pivot relative to the body 400 into a perpendicular attitude that is adapted to position the threaded hole 260 for subsequently receiving the machine screw 218.

The collar 220 defines a pair of diametrically opposed fins or helical locking members 414 (there needs to be at least one such fin 414), which are helix-shaped for preventing (or at least significantly resisting), once the fins 414 are fully engaged in the gypsum of the wall or ceiling during installation of the anchor assembly A therein, further rotation of the anchor assembly A. The helical locking members 414 are located under, and spaced from, a flanged proximal end 418 of the fixed body 400, the flanged end 418 being intended to abut the visible surface of the wall. The angle of the helix of the helical locking members 414 is designed such that it will not act as a thread and pull the fixed body 400 into the drywall due to the dynamic inertia during the installation, and not steep enough to act as a locating tab (that extends in a diametrical plane that is parallel to the longitudinal axis of the anchor) and then break the drywall into a large circular hole when the component is somewhat over-tightened during installation.

The helical locking members 414 do not extend up to the flanged end 418 with a gap 420 therebetween providing space for the dislocated drywall particles to enter.

The aperture 222 defined throughout the collar 220 of the body 400 for allowing the fastener 218 to be slidably inserted therein, defines an hexagonal socket 380 (see FIG. 18) suited for receiving an "Allen" key-type of tool, including the standard hexagonal proximal ends of screwdriver bits (although a socket suitable for engagement by a star-shaped Philips-type bit can also be used). The proximal end of the anchor member 231 defines a cruciform recess 416 (see FIG. 19) adapted to receive a Philips-type screwdriver bit or head. The tool carrying the Philips-type screwdriver bit is inserted through the collar 220 and into engagement with the cruciform recess 416 (the anchor assembly A being in the insertion position, with the anchor member 231 locked to the body 400), such that a rotation of the tool causes the whole anchor assembly A to be driven into the gypsum wall or ceiling, until the fins 414 become lodged in the gypsum and offer resistance to rotation of the anchor assembly A.

Typically for machine screws 218 sized ⅛" and 3/16", the aperture 222 in the collar 220 can be Philips-shaped so that the tool engages only the body 400 for installing the anchor assembly A in the gypsum wall or ceiling. However, for machine screws of larger dimensions, such as ¼", the resulting anchor assembly A is significantly bigger and would be harder to install, whereby the aperture 222 in the collar 220 is hexagonal (see socket 380) and the proximal end of the anchor member 231 includes the afore-described cruciform recess 416 such that the Philips-shaped tool engages the anchor member 231, which is stronger that the body 400 at least when these two components are respectively made of zinc and nylon. If the tool's Philips-shaped bit is too short and cannot reach the cruciform recess 416, the hexagonal proximal end of this bit can still be lodged in the hexagonal socket 380 such that the tool can act on the body 400 to install the anchor assembly A in the gypsum wall or ceiling.

Figure 20:
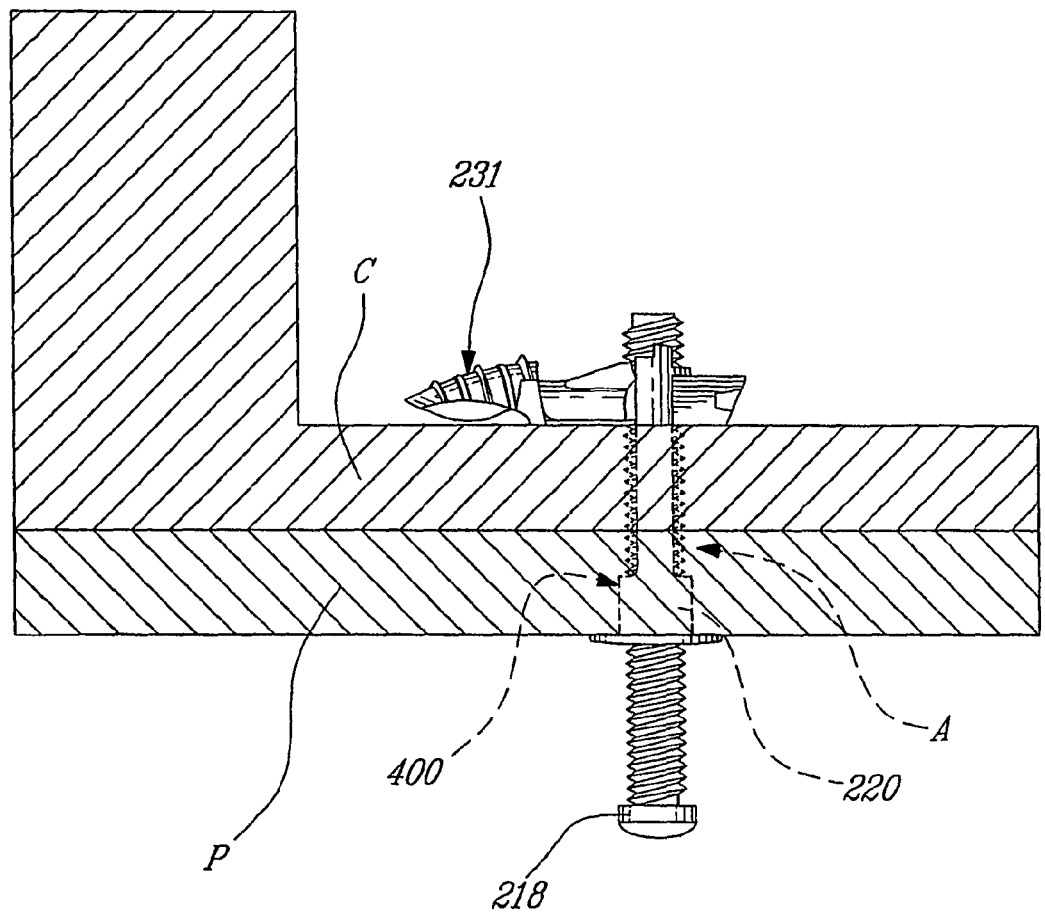
FIG. 20 is a schematic front elevational view of the anchor assembly in the retention position and holding an article against a ceiling.

FIG. 20 shows the anchor assembly A in an installed position thereof into a ceiling C, securely holding an article P to the ceiling C (although the fastener 218 can be further rotatably inserted in the anchor assembly A).

Figure 21A:
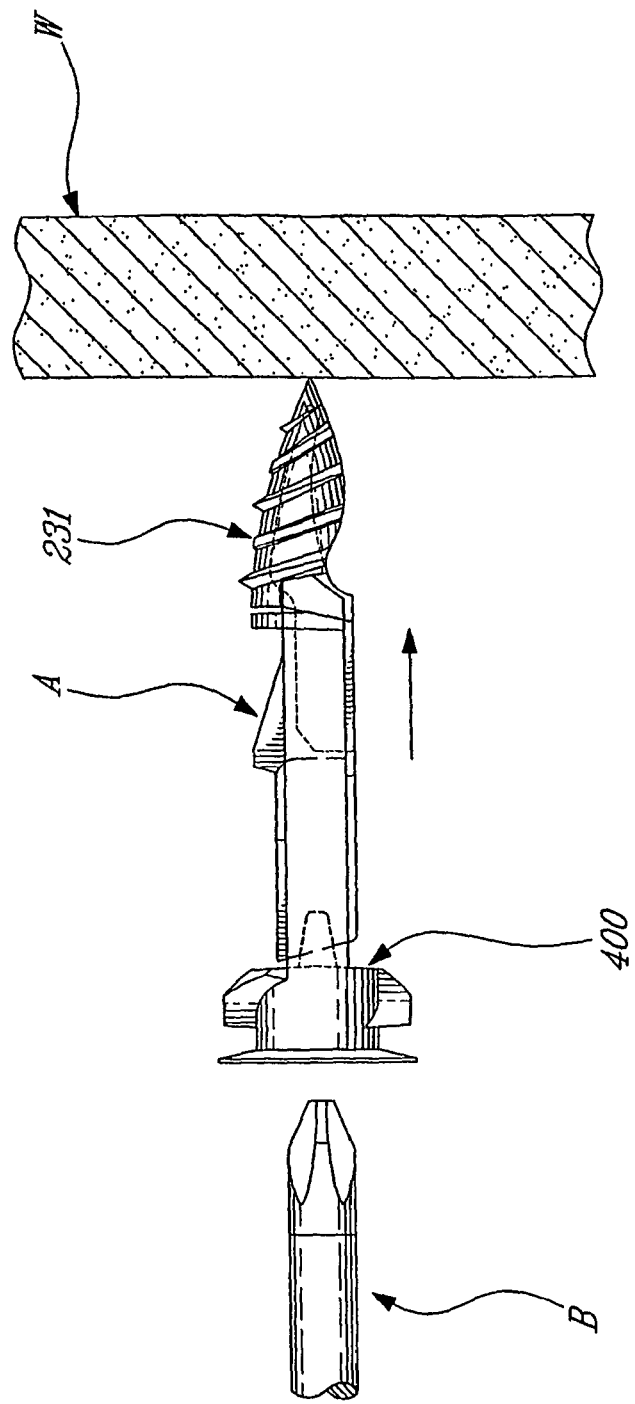
Figure 21B:
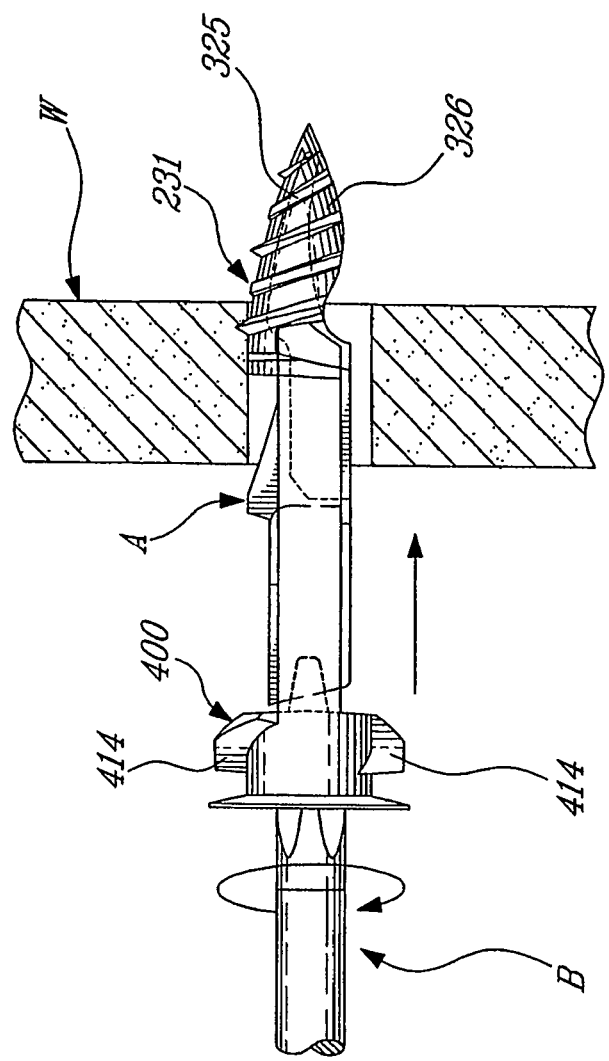

FIGS. 21a to 21f illustrate, in a number of sequential views, various steps for installing the anchor assembly A in a hollow wall W. In FIG. 21a, the anchor assembly A, with its toggle anchor member 231 aligned with the fixed body 400 is on the verge of being rotatably inserted in the wall W using a screwdriver bit B. In FIG. 21b, the anchor assembly A is partly inserted through the wall W under the cutting action of the pointed threaded screw tip 325, and its flute 326, of the anchor member 231.

Figure 21D:
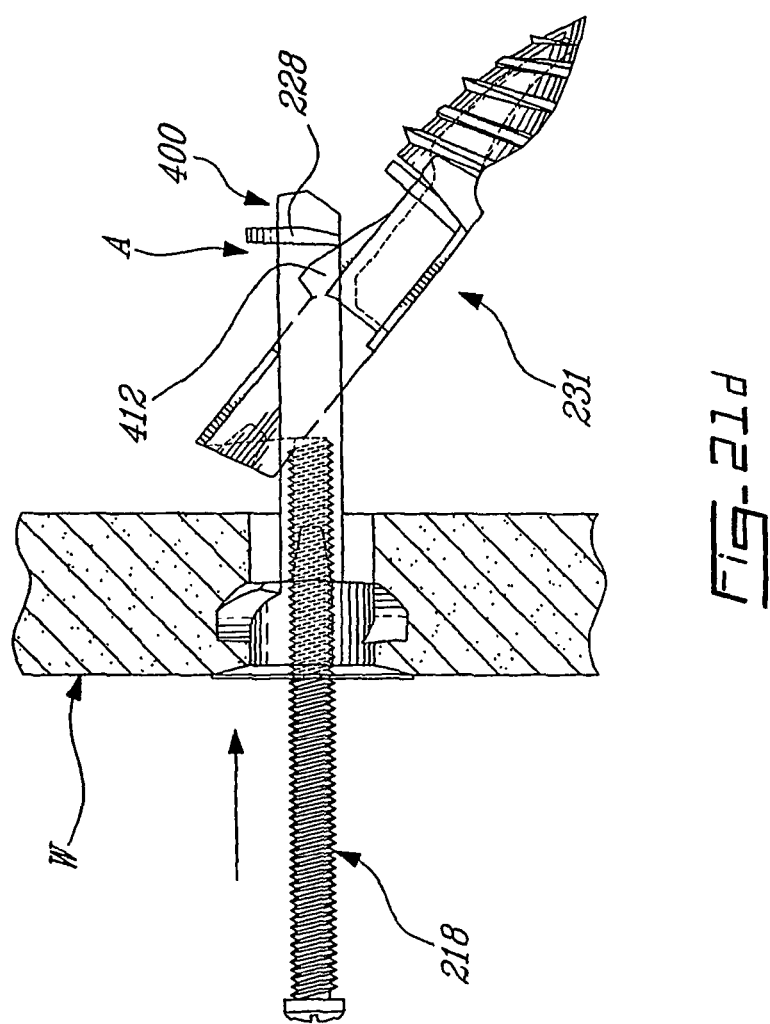

FIG. 21c shows the anchor assembly A fully inserted in the wall W, with the anchor member 231 still in alignment with the fixed body 400, and with the fastener on the verge of being engaged in the anchor assembly A. FIG. 21d illustrates the fastener 218 causing the pivot of the anchor member 231 relative to the fixed body 400, as the advancement of the fastener 218 causes it to engage the proximal end of the anchor member 231 and displace it translationally until the male elements 402 and 406 are freed from their respective female elements 404 and 408, thereby allowing, when the sloped element 412 of the anchor member 231 engages the connecting end 228 of the fixed body 400, the anchor member 231 to pivot.

In FIG. 21e, the anchor member 231 has fully pivoted to its toggle position (i.e. perpendicular to the fixed body 400), and the fastener 218 has threadably engaged the hole 260 defined in the anchor member 231. A further rotation of the fastener 218 draws the anchor member 231 towards the wall W until it is firmly abutted against the hidden surface of the wall W, as seen in FIG. 21f.

It is noted that, in this illustrative embodiment, there are eight interlocking members (four on each side of anchor assembly A) for retaining the toggle anchor member 231 captive of the fixed body 400 while the anchor assembly A is rotatably driven into the wall W (FIGS. 21a and 21b). These interlocking members interlock the two main components (the anchor member 231 and the fixed body 400) during the wall-cutting phase of the installation, in order to provide the required rigidity when driven with the manual or power screwdriver. These interlocking members, as previously described, include the tracks 235 and 236 that cooperate with the posts 224 and 226, and the male elements 402 and 406 that cooperate with the female elements 404 and 408. These interlocking members are designed such that they do not interfere with the pivoting movement of the toggle anchor member 231 and allow setting into final installation position, for the screw to be installed into the threaded toggle anchor member 231.

In the following claims, the terms "wall" and "walls" are meant to cover other hollow structures, e.g. ceilings, etc.

Although the present invention has been described hereinabove by way of specific embodiments thereof, it can be modified, without departing from the spirit and nature of the subject invention as defined in the appended claims.

What is claimed is:

1. An anchor assembly for hollow walls, comprising an anchor body and a toggle member moveably mounted to said anchor body, said toggle member being displaceable between first and second positions thereof, wherein in said first position said toggle member is substantially aligned with said anchor body such that the anchor assembly can be rotated for insertion in the wall, and wherein in said second position said toggle member extends behind the wall at an angle relative to said anchor body with said anchor body extending through the hole in the wall, said toggle member being held captive in said first position but being displaceable longitudinally along said anchor body when an appropriate fastener is introduced in said anchor body, deflector means being provided for causing, after a sufficient longitudinal displacement of said toggle member has released the same from a captive state thereof, said toggle member to pivot relative to said anchor body to said second position, said toggle member being adapted to then threadably receive the fastener such that further rotation of the fastener draws said toggle member against a hidden side of the wall with said anchor body being held substantially fixed relative to the wall, said anchor body and said toggle member being provided with at least first and second locking means that cooperate for retaining said toggle member in said captive state when in said first position, said locking means being spaced apart.

2. An anchor assembly as defined in claim 1, wherein said locking means each include cooperating first and second elements provided on respective ones of said toggle member and said anchor body, said first and second elements being axially engaged to one another.

3. An anchor assembly as defined in claim 2, wherein said first and second elements of each locking means comprise tongue and groove elements provided on respective ones of said toggle member and said anchor body.

4. An anchor assembly as defined in claim 3, wherein said tongue and groove elements extend substantially parallelly to said anchor body.

5. An anchor assembly as defined in claim 3, wherein said anchor body includes a pair of spaced substantially parallel posts, trailing section of said toggle member being slidable between and along said posts such that a longitudinal displacement of said toggle member relative to said anchor body disengages said tongue and groove elements from one another, said toggle member leaving said captive state so as to then be allowed to pivot to said second position as said deflector means engages a distal element of said anchor body.

6. An anchor assembly as defined in claim 5, wherein said distal element of said anchor body comprises a connector attached to distal ends of said posts.

7. An anchor assembly as defined in claim 5, wherein said locking means further include first and second pairs of tracks defined along longitudinal edges of said toggle member and adapted to engage, in said first position, side edges of said posts of said anchor body.

8. An anchor assembly as defined in claim 7, wherein said first and second pairs of tracks are provided on opposite sides of said posts, with an axial space being defined between said first and second pairs of tracks, said axial space being dimensioned so as to receive therein said posts when said toggle member is in said second position thereof, wherein said posts abut said first and second pairs of tracks for limiting said toggle member to a substantially perpendicular position relative to said anchor body thereby facilitating the threaded engagement of the fastener in said toggle member.

9. An anchor assembly as defined in claim 5, wherein said tongue elements are provided on said posts of said anchor body and extend in a substantially same longitudinal direction, and wherein said groove elements are defined on said toggle member and extend in a substantially same longitudinal direction.

10. An anchor assembly as defined in claim 1, wherein said anchor body is made of a plastics material, such as nylon, and said toggle member is made of a metallic material, such as zinc.

11. An anchor assembly for hollow walls, comprising an anchor body and a toggle member moveably mounted to said anchor body, said toggle member being displaceable between first and second positions thereof, wherein in said first position said toggle member is substantially aligned with said anchor body such that the anchor assembly can be rotated for insertion in the wall, and wherein in said second position said toggle member extends behind the wall at an angle relative to said anchor body with said anchor body extending through the hole in the wall, said toggle member being held captive in said first position but being displaceable longitudinally along said anchor body when an appropriate fastener is introduced in said anchor body, deflector means being provided for causing, after a sufficient longitudinal displacement of said toggle member has released the same from a captive state thereof, said toggle member to pivot relative to said anchor body to said second position, said toggle member being adapted to then threadably receive the fastener such that further rotation of the fastener draws said toggle member against a hidden side of the wall with said anchor body being held substantially fixed relative to the wall, wherein said anchor body comprises a proximal collar provided on a leading side thereof with at least one curved locking protrusion extending outwardly from said collar and adapted to engage the wall at the end of the rotary installation of said anchor assembly in the wall and thereby provide resistance to a further rotation of said anchor assembly relative to the wall.

12. An anchor assembly as defined in claim 11, wherein there are provided two said locking protrusions.

13. An anchor assembly as defined in claim 12, wherein each said curved locking protrusion includes a fin.

14. An anchor assembly as defined in claim 11, wherein each said curved locking protrusion is helix-shaped.

15. An anchor assembly as defined in claim 12, wherein said locking protrusions are provided substantially on diametrically opposed sides of said collar.

16. An anchor assembly as defined in claim 11, wherein said anchor body comprises a flanged end, proximally of said collar, said flanged end being adapted to rest against a visible surface of the wall once said anchor body has been installed in the wall.

17. An anchor assembly as defined in claim 16, wherein a space is provided axially between said flanged end and each said locking protrusion, for receiving drywall particles.

18. An anchor assembly for hollow walls, comprising an anchor body and a toggle member moveably mounted to said anchor body, said toggle member being displaceable between first and second positions thereof, wherein in said first position said toggle member is substantially aligned with said anchor body such that the anchor assembly can be rotated for insertion in the wall, and wherein in said second position said toggle member extends behind the wall at an angle relative to said anchor body with said anchor body extending through the hole in the wall, said toggle member being held captive in said first position but being displaceable longitudinally along said anchor body when an appropriate fastener is introduced in said anchor body, deflector means being provided for causing, after a sufficient longitudinal displacement of said toggle member has released the same from a captive state thereof, said toggle member to pivot relative to said anchor body to said second position, said toggle member being adapted to then threadably receive the fastener such that further rotation of the fastener draws said toggle member against a hidden side of the wall with said anchor body being held substantially fixed relative to the wall, wherein said anchor body is made of a plastics material, such as nylon, and said toggle member is made of a metallic material, such as zinc, temporary locking means being provided between said anchor body and said toggle member in said first position for providing rigidity to said anchor assembly.

* * * * *